Aug. 17, 1943.    J. C. SCHELL    2,326,975
COMBINATION COOKER AND GAS EXHAUST
Filed May 10, 1941    3 Sheets-Sheet 2
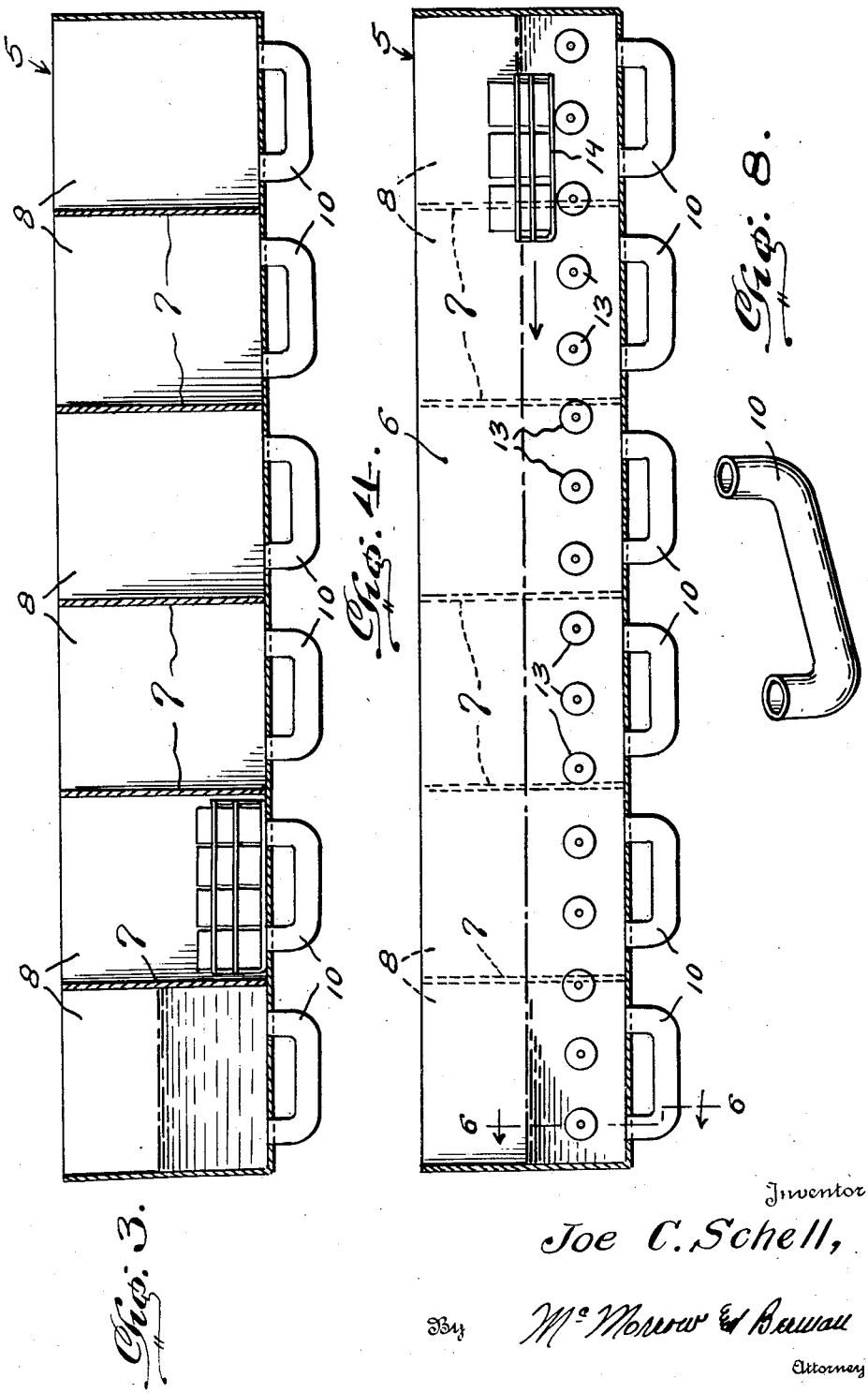
Inventor
Joe C. Schell, Aug. 17, 1943.   J. C. SCHELL   2,326,975
COMBINATION COOKER AND GAS EXHAUST
Filed May 10, 1941   3 Sheets-Sheet 3
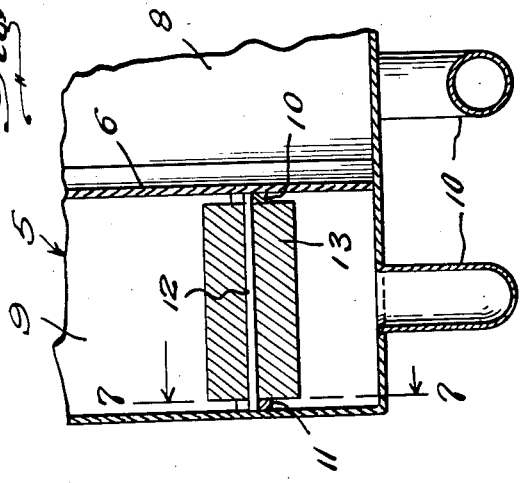
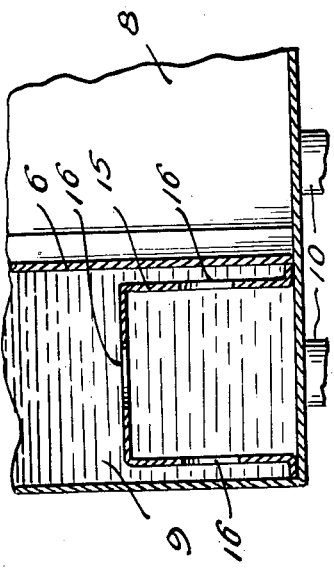
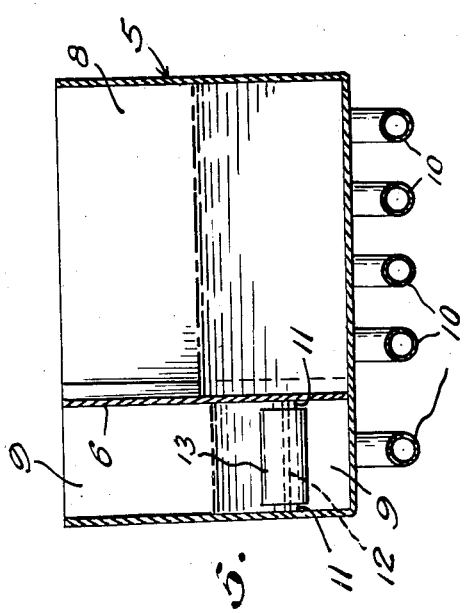
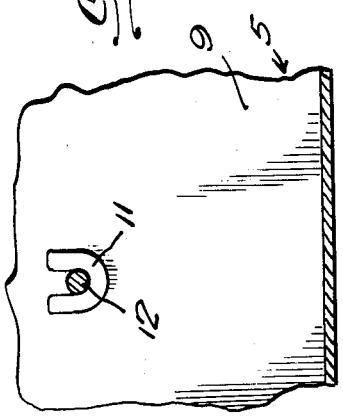
Inventor
Joe C. Schell,
By McMorrow & Berman
Attorneys Patented Aug. 17, 1943

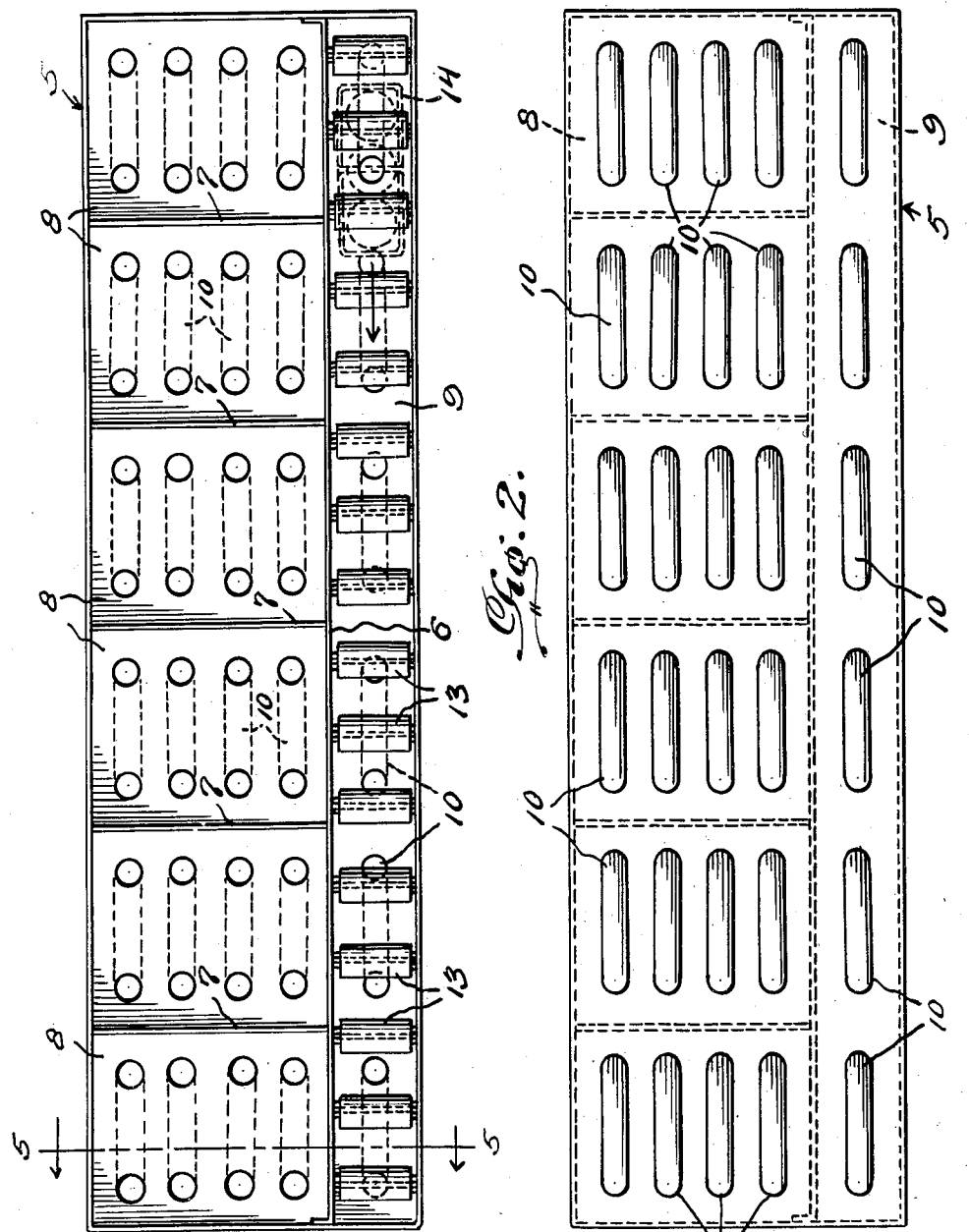

2,326,975

UNITED STATES PATENT OFFICE 2,326,975

COMBINATION COOKER AND GAS EXHAUST

Joe C. Schell, Powell, Mo.

Application May 10, 1941, Serial No. 392,991

1 Claim. (Cl. 53—1)

This invention relates to a combination cooker and gas exhaust especially adapted for cooking and processing fruit, vegetables and the like, and has for the primary object the provision of a device of this character for home and small cannery use, wherein preserving of fruit or vegetables may be successfully accomplished with as good if not better results than obtainable by large factories with expensive equipment.

Another object of this invention is the provision of a device of the above stated character, whereby the fruit or vegetables may be first scalded, then exhausted of gases after being placed in containers and then cooked after the containers have been hermetically sealed so that the flavor and nutritious values of the fruit or vegetables will be conserved to the utmost.

A further object of this invention is the provision of a device of the kind specified which may be economically constructed and heated by its arrangement on any conventional type of stove or furnace, frequently found within homes or small canneries and will only require a minimum amount of fuel for the heating thereof due to the provision made in the construction of said device for the free circulation of the fluid employed in the preserving or cooking of the fruit or vegetables.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view, illustrating a combination cooker and gas exhaust constructed in accordance with my invention.

Figure 2 is a bottom plan view illustrating the device.

Figure 3 is a vertical sectional view illustrating a plurality of fluid compartments arranged within the device.

Figure 4 is a view similar to Figure 3 illustrating the gas exhaust chamber and the means of movably mounting the containers of fruit or vegetables therein.

Figure 5 is a transverse sectional view taken on the line 5—5 of Figure 2.

Figure 6 is a fragmentary transverse sectional view taken on the line 6—6 of Figure 4.

Figure 7 is a detail sectional view taken on the line 7—7 of Figure 6.

Figure 8 is a perspective view illustrating one of the fluid tubes.

Figure 9 is a fragmentary transverse sectional view illustrating a modified form of my invention.

Referring in detail to the drawings, the numeral 5 indicates an elongated tank fully open at its upper end and constructed of fire resisting and heat conductive material. A longitudinal and a plurality of transversely arranged partitions are mounted within the tank and are designated by the characters 6 and 7, respectively. The partitions 6 and 7 cooperate with each other and the vertical walls of the tank in forming therein a plurality of fluid compartments 8 and an exhaust chamber 9 extending the full length of the tank. A plurality of fluid circulating tubes 10 constructed of heat conductive material are connected with openings provided in the bottoms of the compartments 8 and the exhaust chamber 9. The tubes are of substantially U shape having the ends thereof connected with the openings provided in the bottoms of said receptacles and exhaust chamber.

By referring to Figure 1 it will be seen that each compartment has a series of tubes that will allow the fluid to circulate in and out of said compartments. This also applies in connection with the tubes connected with the exhaust chamber.

The tubes extend an appropriate distance below the bottom of the tank so that heat from a source such as a stove, furnace or the like, may readily pass about said tubes to quickly and efficiently heat the fluid within the compartments as well as within the exhaust chamber. The ends of the tubes may be welded or otherwise secured to the walls of the openings provided in the bottom of the tank.

Mounted upon the longitudinal partition 6 and one of the vertical walls of the tank within the exhaust chamber 9 are substantially U-shaped bearings or brackets 11 to rotatably and removably receive pintles 12 of rollers 13 arranged in spaced relation and at a selected distance below the bottom wall of the exhaust chamber on which basket-type carriers 14 containing containers may rest and be moved from one end of the exhaust chamber to the other end through the fluid contained therein.

If desired, the rollers may be made smaller for the support of an endless belt or conveyor on which the carriers 14 may be positioned to move or if the device in entirety is constructed upon a small scale, a substantially U-shaped inverted rest 15 may be employed within the chamber 9, as shown in Figure 9, the walls of which are provided with fluid circulating ports 16.

The carriers 14 may be positioned on the rest 15 and slid thereon from one end of the chamber 9 to the other end.

In the use of this device, the compartments 8 as well as the chamber 9 are partly filled with water or some other suitable fluid and the first compartment to the left in Figure 1 is preferably used for scalding fruit or vegetables. After this operation, the fruit or vegetables are placed in their containers which are left open and arranged within the basket-like carriers 14. The carriers having the containers therein are then positioned in the exhaust chamber 9 and gradually moved from one end to the opposite end at which time the fruit or vegetables are heated sufficiently to cause gases to pass thereoff essential in the preserving of fruit or vegetables. After this treatment the carriers are then arranged within the other compartments 8 being first hermetically sealed and are allowed to remain therein for cooking. After the cooking operation has been completed the carriers can be easily lifted from the compartments and the containers removed therefrom for cooling.

It is to be understood that the tank 5 is arranged upon any type of heating source such as a stove or furnace of the brick or stone wall type, consequently completing a device which can be economically set up and one that will allow fruit or vegetable processing and cooking to be efficiently and rapidly accomplished.

The circulating tubes projecting below the bottom of the tank will allow the fluid of the compartments and chamber 9 to be brought in close proximity to the source of heat so that the fluid may be quickly and highly heated with a minimum consumption of fuel.

The rollers 13 having the pintles thereof removably mounted within the chamber 9 will permit the rollers to all be quickly removed and reinstated in the chamber 9. This is desirable as when the rollers are removed the chamber 9 as well as the tubes thereof can be easily cleaned to permit the chamber being kept in a highly sanitary condition. The compartments 8 being fully open at their upper ends allow the compartments as well as the tubes thereof to be cleaned readily.

While I have shown and described the preferred embodiment of my invention, it will be understood that minor changes on construction, combination and arrangement of parts may be made without departing from the spirit and scope of the invention as claimed.

Having thus described the invention, what I claim is:

In a combination cooker and gas exhaust, an elongated heated tank, a series of transverse partitions and a longitudinal partition dividing said tank into liquid containing scalding and cooking compartments and an exhaust chamber extending the full length of the tank, inverted substantially U-shaped fluid circulating tubes located below the bottom wall of the tank and connected with the interior of said tank to permit quick heating of the liquid in the tank and to support the tank on a heating source or to extend into the latter when the bottom wall of the tank is supported directly thereon, manually movable carriers for food containers placeable in the compartments and the chamber and movable from one end of the exhaust chamber to the other end thereof, and an inverted U shaped perforated rest located in and extending substantially the full length of the exhaust chamber on which said carriers move and acting to support the latter partly within the liquid of the chamber.

JOE C. SCHELL.